US008711907B2

(12) United States Patent
Zhu et al.

(10) Patent No.: US 8,711,907 B2
(45) Date of Patent: Apr. 29, 2014

(54) PMI FEEDBACK WITH CODEBOOK INTERPOLATION

(75) Inventors: Yuan Zhu, Beijing (CN); Xiaogang Chen, Beijing (CN); Qinghua Li, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 13/077,905

(22) Filed: Mar. 31, 2011

(65) Prior Publication Data

US 2012/0082190 A1 Apr. 5, 2012

Related U.S. Application Data

(60) Provisional application No. 61/389,080, filed on Oct. 1, 2010, provisional application No. 61/410,740, filed on Nov. 5, 2010.

(51) Int. Cl.
*H04B 1/38* (2006.01)

(52) U.S. Cl.
USPC ........... 375/219; 375/220; 375/260; 375/267; 375/295; 375/296; 375/299; 375/316; 375/340; 375/347; 455/101; 455/132; 455/500; 455/562.1; 370/334; 370/464; 370/480

(58) Field of Classification Search
USPC ......... 375/219, 220, 260, 267, 295, 296, 299, 375/316, 340, 347; 455/101, 132, 500, 455/562.1; 370/334, 464, 480
See application file for complete search history.

(56) References Cited

U.S. PATENT DOCUMENTS

| 7,649,831 | B2 | 1/2010 | Van Rensburg et al. |
| 7,676,007 | B1* | 3/2010 | Choi et al. ............ 375/347 |
| 7,830,977 | B2 | 11/2010 | Li et al. |
| 8,179,775 | B2* | 5/2012 | Chen et al. ............ 370/203 |
| 2010/0322176 | A1 | 12/2010 | Chen et al. |

OTHER PUBLICATIONS

"WF on Aperiodic PUSCH CQI Modes in Rel. 10," 3GPP TSG RAN WG1 #62, R1-105010, Agenda Item: 6.3.3, Document for: Decision, Aug. 23-27, 2010, pp. 1-2, Madrid, Spain.
"Views on PUSCH based CQI reporting for 4Tx," 3GPP TSG RAN WG1 Meeting #63, R1-106228, Agenda Item: 6.3.2.2, Document for: Discussion and Decision, Source: Intel Corporation (UK) Ltd, Nov. 15-19, 2010, pp. 1-6, Jacksonville, USA.
"Way Forward on Enhancement for Rel. 10 DL MIMO," 3GPP TSG RAN WG1 62, R1-105032, Agenda Item: 6.3.3, Document for: Decision, Aug. 23-27, 2010, pp. 1-2, Madrid, Spain.
"Evaluation of 4Tx Enhanced MIMO feedbacks for LTE-A," 3GPP TSG RAN WG1 Meeting #62, R1-104374, Agenda Item: 6.3.3, Document for: Discussion and Decision, Source: Intel Corporation (UK) Ltd, Aug. 23-27, 2010, pp. 1-5, Madrid, Spain.
"UMTS Long Term Evolution (LTE) Technology Introduction," Rohde & Schwarz, Application Note 1MA111, C. Gessner, Mar. 2007, pp. 1-32.
Pesavento et al., "LTE Tutorial part 2 Advanced topics in LTE," MIMON advancing LTE by SDR, Jun. 2010, pp. 1-41, UK.

(Continued)

*Primary Examiner* — Leon Flores
(74) *Attorney, Agent, or Firm* — Schwabe, Williamson & Wyatt, P.C.

(57) ABSTRACT

Various embodiments of this disclosure may describe apparatuses, methods, and systems for interpolation of precoding matrixes to increase feedback accuracy of the channel state information (CSI) feedback in a wireless communication network. Other embodiments may also be disclosed or claimed.

18 Claims, 5 Drawing Sheets

(56) References Cited

OTHER PUBLICATIONS

"Introducing LTE-Advanced," Agilent Technologies, Application Note, WiMAX Forum, Nov. 30, 2010, pp. 1-36, USA.
"3rd Generation Partnership Project; Technical Specification Group Radio Access Network; Evolved Universal Terrestrial Radio Access (E-UTRA); Physical layer procedures (Release 10)," Draft 3GPP TS 36.213 Va0.0, Advanced LTE, Dec. 2010, pp. 1-98.
"Wireless Test World 2008 Moving Into New Era of Wireless," Presented by Sandy Fraser, 3GPP Long Term Evolution (LTE) Protocol Primer, Agilent Technologies, Jun. 25, 2008, pp. 1-68.
Zyren et al., "Overview of the 3GPP Long Term Evolution Physical Layer," Freescale Semiconductor, Jul. 2007, pp. 1-27.

* cited by examiner

PMI FEEDBACK WITH CODEBOOK INTERPOLATION

CROSS REFERENCE TO RELATED APPLICATIONS

The present application claims priority to U.S. provisional application 61/389,080, titled "Advanced Wireless Communication Systems and Techniques," filed Oct. 1, 2010, and U.S. provisional application 61/410,740, titled "Advanced Wireless Communication Systems and Techniques," filed Nov. 5, 2010. The contents of these two applications are incorporated herein by reference.

TECHNICAL FIELD

The present disclosure generally relates to wireless communication, in particular, to channel state information feedback during wireless communication.

BACKGROUND

Long Term Evolution (LTE) wireless networks are being standardized by the $3^{rd}$ Generation Partnership Project (3GPP) working groups. The general operations of the physical channels are described in the LTE specifications, for example: "3rd Generation Partnership Project; Technical Specification Group Radio Access Network; Evolved Universal Terrestrial Radio Access (E-UTRA); Physical Channels and Modulation (3GPP TS 36.211 Release 8)."

LTE networks may incorporate a number of user equipments (UEs) and a number of Node Bs. A UE, also commonly referred to as a terminal or a mobile station, may be a wired or wireless device, such as a cellular phone, a notebook computer, a personal digital assistant (PDA), a wireless modem card, and so on. A Node B may be a fixed station, such as a base transceiver system (BTS), an access point (AP), a base station (BS), etc. As improvements of networks are made, the Node B may evolve to provide different functionalities, so a Node B may also be referred to as an evolved Node B (eNB).

An eNB may contain radio frequency transmitter(s) and receiver(s) to communicate with a UE. Similarly, a UE may contain radio frequency transmitter(s) and receiver(s) to communicate with an eNB. Communication from the UE to the eNB may be referred to as Uplink communication (UL), whereas communication from the eNB to the UE may be referred to as downlink (DL) communication. Multiple UEs may be time and frequency multiplexed onto a UL or a DL channel. The UL channel may include a physical uplink shared channel (PUSCH), and a physical uplink control channel (PUCCH). The DL channel may include a physical downlink shared channel (PDSCH) and a physical downlink control channel (PDCCH).

A UE may estimate channel conditions and then report the estimated channel conditions to the eNB in order to gain better performance out of the channel. The process of UE providing the channel condition information to the eNB may be referred to as channel state information (CSI) feedback. The CSI feedback may include a channel quality index (CQI), a precoding (beamforming) matrix indicator (PMI), and a rank indication (RI), which are various matrices that may be measured or otherwise derived at the UE. As the channel may be continuously changing, the UE may provide the CSI feedback to the eNB for multiple points across the channel bandwidth, at regular time intervals, or aperiodically, up to several hundred times a second.

PMI may reflect the recommended precoding matrices within the recommended rank. PMI may uniquely identify a precoding matrix (precoder) within a codebook shared by the UE and the eNB. The accuracy of PMI feedback may be related to the size of the codebook. In general, the bigger the codebook, the smaller the quantization error may be when the precoding matrix is estimated by the UE. However, in practice, the size of the codebook may not be increased arbitrarily for various reasons, including, for example, to maintain backward compatibility, and to reduce feedback overhead.

It may be possible to reduce quantization error in the CSI feedback by reporting multiple PMIs. For example, proposals to the draft 3GPP Technical Specification (TS) 36.213, Release 10 include suggestions to improve the wideband performance by reporting multiple subband PMIs via PUSCH under mode 3-2. Similar suggestions have also been proposed to improve the feedback accuracy in other reporting modes, including PUCCH under mode 2-1, (reporting a subband PMI in addition to a wideband PMI), and PUSCH under mode 3-1, (reporting multiple wideband PMIs).

The gain of sending multiple subband PMIs compared with sending only one wideband PMI may depend on the frequency selectivity of the channel, which may be related to 1) antenna spacing and configuration; 2) inter-site distance and 3) random delay error in the transmission antennas. When the channel is not highly frequency selective, sending more subband PMIs may not bring high gains because the subband PMIs may be similar to the wideband PMI. On the other hand, when the channel is highly frequency selective, sending more subband PMIs may improve the wideband performance significantly. As such, there may be a trade-off between feedback overhead and beamforming performance.

BRIEF DESCRIPTION OF THE DRAWINGS

Embodiments of the present disclosure will be described by way of exemplary illustrations, but not limitations, shown in the accompanying drawings in which like references denote similar elements, and in which.

DETAILED DESCRIPTION OF ILLUSTRATIVE EMBODIMENTS

In the following detailed description, reference is made to the accompanying drawings which form a part hereof, and in which are shown by way of illustration embodiments in which the disclosure may be practiced. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

Various operations may be described as multiple discrete operations in turn, in a manner that may be helpful in understanding embodiments of the present disclosure; however, the order of description should not be construed to imply that these operations are order dependent.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Various embodiments of this disclosure may describe apparatuses, methods, and systems for interpolating precoding matrix to increase feedback accuracy of the channel state information (CSI) in a wireless communication network.

Figure 1:
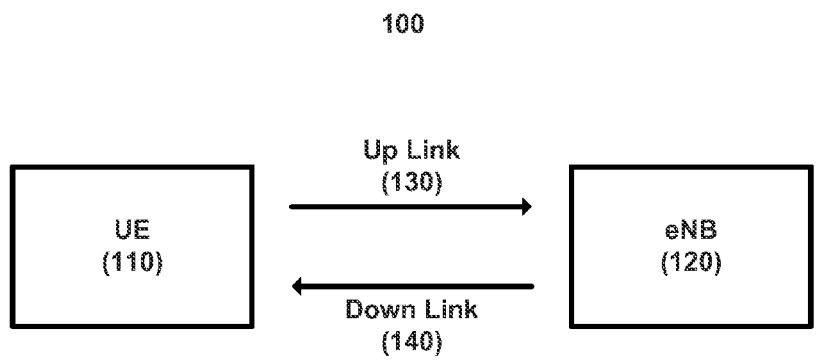
FIG. 1 is a block diagram illustrating a wireless communication network in accordance with various embodiments of the present disclosure.

FIG. 1 is a block diagram illustrating a wireless communication network in accordance with various embodiments of the present disclosure. In various embodiments, as illustrated, a wireless communication network 100 may include a user equipment (UE) 110 and an evolved Node B (eNB) 120. In various embodiments, the UE 110 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), a set-top box, and/or other suitable relatively stationary, portable, or mobile electronic devices. The eNB 120 may include an Access Point (AP), a base station, a base transceiver station, etc. In various embodiments, the eNB 120 may be a fixed station (e.g., a fixed node), or a mobile station/node. Although FIG. 1 only depicts a single UE 110 and a single eNB 120, it is understood that the wireless network 100 may include multiple UEs and/or multiple eNBs.

In various embodiments, the UE 110 may use a variety of modulation techniques to communicate with the eNB 120, such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), orthogonal frequency division multiple access (OFDMA), SC-FDMA (single carrier FDMA), and/or other suitable modulation techniques to communicate via wireless links. In one example, the UE 110 and the eNB 120 may operate in accordance with suitable wireless communication protocols that require very low power such as Bluetooth, Zigbee, near field communication (NFC), ultra-wideband (UWB), and/or radio frequency identification (RFID) to implement a wireless personal area network (WPAN), a wireless local area network (WLAN), and/or a wireless metropolitan area network (WMAN).

In various embodiments, the UE 110 and/or the eNB 120 may include a plurality of antennas to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO, etc. The UE 110 may provide CSI feedback to the eNB 120 via one or more up link channels 130, and the eNB 120 may adjust one or more down link channels 140 based on the received CSI feedback. It is known that the feedback accuracy of the CSI may affect the performance of the MIMO system.

In various embodiments, the uplink channels 130 and the downlink channels 140 may be associated with one or more frequency bands, which may or may not be shared by the uplink channels 130 and the downlink channels 140. The one or more frequency bands may be further divided into one or more subbands, which may or may not be shared by the uplink and downlink channels 130 and 140. Each frequency subband, one or more aggregated subbands, or the one or more frequency bands for the uplink or downlink channels (wideband) may be referred to as a frequency resource.

Figure 2:
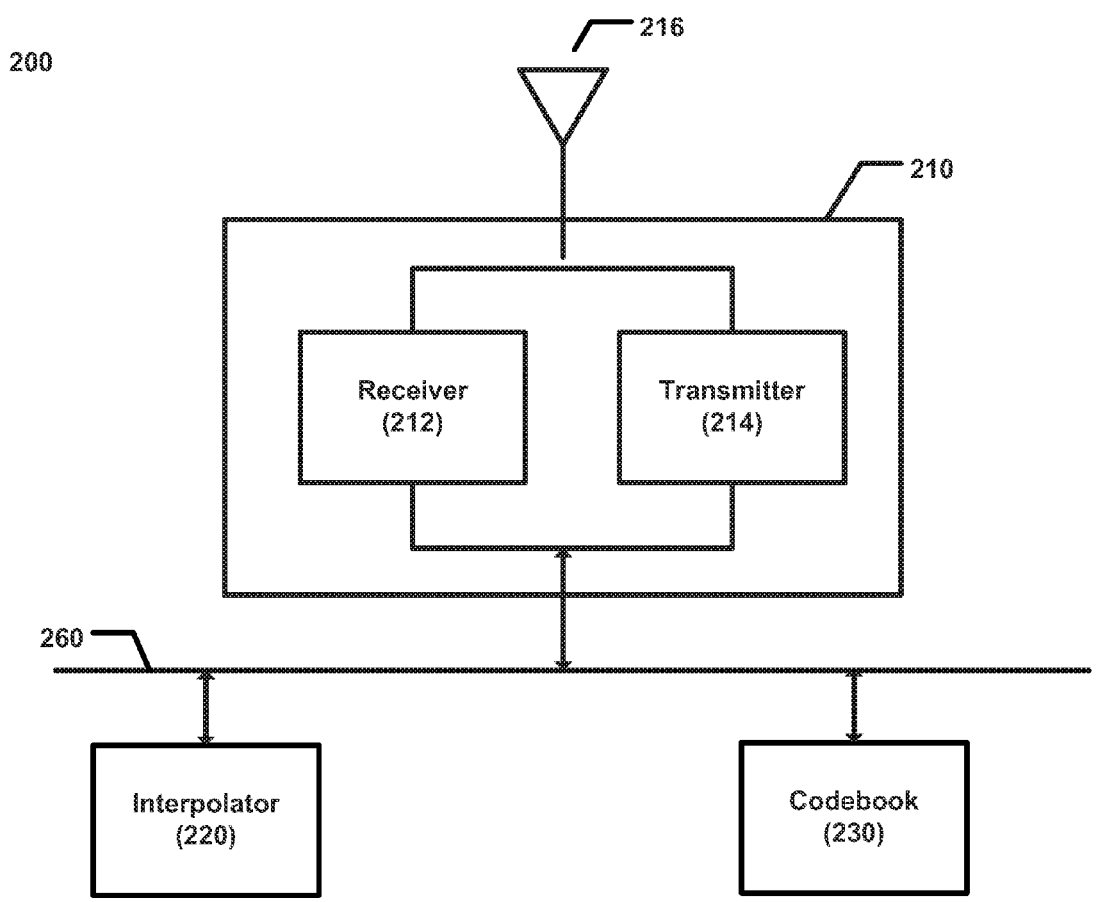
FIG. 2 is a block diagram illustrating an example embodiment of a station 200 in accordance with various embodiments.

FIG. 2 is a block diagram illustrating an example embodiment of a station 200 in accordance with various embodiments. In various embodiments, the station 200 may be the UE 110 or the eNB 120 illustrated in FIG. 1. The station 200 may include a communication interface 210 coupled with an interpolator 220 and a codebook 230 via a bus 260. The codebook 230 may include multiple precoding matrices (precoders) that are agreed upon by the UE 110 and the eNB 120 before the communication between the UE 110 and the eNB 120 may be established. The interpolator 220 may be used by either the UE 110 or the eNB 120 to perform interpolation of the precoders. More details of the usage of the interpolator 220 and the codebook 230 will be provided in later sections of this disclosure.

In various embodiments, the communication interface 210 (e.g., a radio-frequency (RF) physical-layer (PHY) sub-system) may include a receiver 212, a transmitter 214, and an antenna 216. The communication interface 210 may receive and/or transmit data via the receiver 212 and the transmitter 214, respectively. The antenna 216 may include one or more directional or omni-directional antennas such as dipole antennas, monopole antennas, patch antennas, loop antennas, microstrip antennas, and/or other types of antennas suitable for transmission of RF signals. Although FIG. 2 depicts a single antenna, the station 200 may include additional antennas. For example, the station 200 may include a plurality of antennas to facilitate MIMO transmission.

Although FIG. 2 depicts components of the station 200 coupling to each other via the bus 260, these components may be operatively coupled to each other via other suitable direct or indirect connections (e.g., a point-to-point connection or a point-to-multiple point connection). While FIG. 2 depicts particular components, the station 200 may include other suitable components to operate within a wireless communication network, such as one or more modulators, equalizers, scramblers, encoders, etc., which are not shown for simplicity purpose. Further, although the components shown in FIG. 2 are depicted as separate blocks within the station 200, the functions performed by some of these blocks may be integrated within a single semiconductor circuit or may be implemented using two or more separate integrated circuits. For example, although the receiver 212 and the transmitter 214 are depicted as separate blocks within the communication interface 210, the receiver 212 may be integrated into the transmitter 214 (e.g., a transceiver). In various embodiments, the interpolator 220 and the codebook 230 may be integrated into the communication interface 210.

In various embodiments, the UE 110 may transmit CSI feedback to the eNB 120 via the transmitter 214. The CSI feedback may include information related to channel quality index (CQI), precoding matrix indicator (PMI), and rank indication (RI). PMI may reference, or otherwise uniquely identity, a precoder within the codebook 230. The eNB 120 may adjust the downlink channel based on the precoder referenced by the PMI. In various embodiments, the UE 110 may report multiple PMIs within a CSI feedback message to further reduce quantization error, as will be discussed in detail in the following sections of this disclosure.

In various embodiments, the UE 110 may be configured to report a wideband PMI and a subband PMI within a CSI feedback message assuming that the specific subband may be used during the down link transmission. For example, the UE 110 may be configured to report both a wideband W2 (the second precoding matrix) PMI and a subband W2 PMI via the PUCCH under the reporting mode 2-1, as proposed in the draft 3GPP TS 36.213, Release 10.

In various embodiments, the UE 110 may select a subband precoder as indicated by the subband PMI so that an interpolated precoder based on a wideband precoder indentified by the wideband PMI and the selected subband precoder may yield better channel performance. Similarly, the eNB 120 may interpolate a subband precoder identified by the wideband PMI and the subband PMI in the CSI feedback, and apply the interpolated subband precoder for the downlink transmission on the subband. The UE 110 and the eNB 120 may interpolate the subband precoder based on a variety of publically know or proprietary methods, so long as the interpolation method is agreed upon between the UE 110 and the eNB 120.

In various embodiments, the interpolation method may be a linear average of the wideband precoder and the subband precoder. For example, the wideband PMI may be represented as i and the subband PMI may be represented as j. The precoders corresponding to the i and j may be denoted as $v_i$ and $v_j$, respectively. Assuming the eNB 120 has four transmission antennas, for rank 1 transmission, both $v_i$ and $v_j$ may be 4×1 vectors.

In various embodiments, if i equals to j, then the interpolated subband precoder may be $v_i$. If i does not equal to j, and $v_i$ and $v_j$ are both discrete Fourier transform (DFT) vectors, $v_i$ and $v_j$ may be represented as:

$$v_i = \frac{1}{2}[1 \ e^{j\theta_i} \ e^{j2\theta_i} \ e^{j3\theta_i}]^T, \text{ and}$$

$$v_j = \frac{1}{2}[1 \ e^{j\theta_j} \ e^{j2\theta_j} \ e^{j3\theta_j}]^T,$$

wherein the $\theta_i$ and the $\theta_j$ may represent a phase difference among the rank 1 precoders. And the interpolated subband precoder may be represented as:

$$v_{SB} = \frac{1}{2}\left[1 \ e^{j\frac{\theta_i+\mu\theta_j}{1+\mu}} \ e^{j2\left(\frac{\theta_i+\mu\theta_j}{1+\mu}\right)} \ e^{j3\left(\frac{\theta_i+\mu\theta_j}{1+\mu}\right)}\right]^T,$$

wherein the μ is a phase scaling factor, and may be equal to 1 or ½.

In various embodiments, if one of the two precoding vectors $v_i$ and $v_j$ is a non-DFT vector, $v_i$ and $v_j$ may be represented as:

$$v_i = \frac{1}{2}[1 \ e^{j\alpha_1} \ e^{j\alpha_2} \ e^{j\alpha_3}]^T, \text{ and}$$

$$v_j = \frac{1}{2}[1 \ e^{j\beta_1} \ e^{j\beta_2} \ e^{j\beta_3}]^T,$$

wherein the $\alpha_1$ to $\alpha_3$ and the $\beta_1$ to $\beta_3$ represent the various phases of the rank 1 precoders.
The subband precoder may be interpolated as:

$$v_{SB} = \frac{1}{2}\left[1 \ e^{j\frac{(\alpha_1+\mu\beta_1)}{1+\mu}} \ e^{j\frac{(\alpha_2+\mu\beta_2)}{1+\mu}} \ e^{j\frac{(\alpha_3+\mu\beta_3)}{1+\mu}}\right]^T.$$

In various embodiments, for rank 2 transmission, $v_i$ and $v_j$ may be represented as:

$$v_i = \frac{1}{2\sqrt{2}}\begin{bmatrix} 1 & e^{j\alpha_4} \\ e^{j\alpha_1} & e^{j\alpha_5} \\ e^{j\alpha_2} & e^{j\alpha_6} \\ e^{j\alpha_3} & e^{j\alpha_7} \end{bmatrix}^T, \text{ and}$$

$$v_j = \frac{1}{2\sqrt{2}}\begin{bmatrix} 1 & e^{j\beta_4} \\ e^{j\beta_1} & e^{j\beta_5} \\ e^{j\beta_2} & e^{j\beta_6} \\ e^{j\beta_3} & e^{j\beta_7} \end{bmatrix}^T$$

wherein the $\alpha_1$ to $\alpha_7$ and the $\beta_1$ to $\beta_7$ may represent the various phases of the rank 2 precoders. The interpolated subband precoder may be represented as:

$$v_{SB} = \frac{1}{2\sqrt{2(1+\varepsilon^2)}}\begin{bmatrix} 1 & \varepsilon e^{\frac{j(\alpha_4+\mu\beta_4)}{2}} \\ e^{\frac{j(\alpha_1+\beta_1)}{2}} & \varepsilon e^{\frac{j(\alpha_5+\mu\beta_5)}{2}} \\ e^{\frac{j(\alpha_2+\beta_2)}{2}} & -\varepsilon e^{\frac{j(\alpha_2+\beta_2+\alpha_4+\mu\beta_4)}{2}} \\ e^{\frac{j(\alpha_3+\beta_3)}{2}} & -\varepsilon e^{\frac{j(\alpha_3+\beta_3-\alpha_1-\beta_1+\alpha_5+\mu\beta_5)}{2}} \end{bmatrix}^T,$$

wherein the c may be a scalar between 0 and 1 for the rank 2 transmission. In various embodiments, for example, if the secondary principle Eigen value is considerably smaller than that of the principle Eigen value, the value of the c may be fixed at 1. In various embodiments, the value of the ϵ may be signaled by the eNB 120. In various embodiments, signaling of the ϵ may be cell-specific or UE specific.

Figure 3:
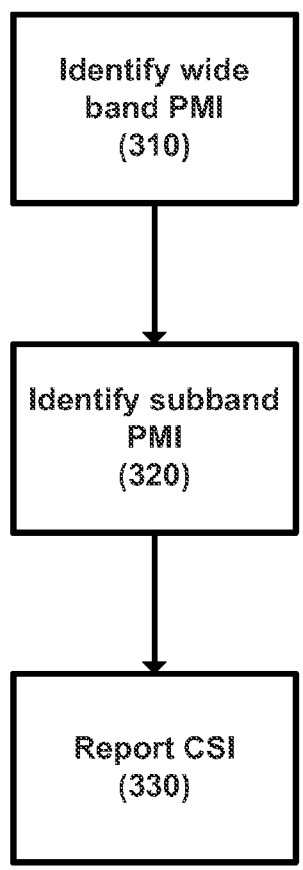
FIG. 3 is a flow diagram illustrating a portion of operations of CSI feedback, in accordance with various embodiments of the present disclosure.

FIG. 3 is a flow diagram illustrating a portion of operations of CSI feedback, in accordance with various embodiments of the present disclosure. In various embodiments, as illustrated, in block 310, the UE 110 may search the codebook 230 and identify a first precoder for the entire frequency band (e.g., wideband PMI). The UE 110 may perform the search and the identification of the first precoder based on various criteria. For example, the UE 110 may search for a precoder among the codebook 230 that may provide the highest channel capacity, or the UE 110 may search for a precoder that may provide minimum chordal distance between the precoder and the principle Eigen vectors of the channel after single value decomposition, etc.

In block 320, the UE 110 may interpolate, via the interpolator 220, the first precoder with a second precoder within the codebook to produce an interpolated precoder. If the UE 110 finds that the interpolated precoder may result in higher channel performance for the given subband, the UE 110 may report the second precoder (e.g., as indicated in the subband PMI) to the eNB 120 via a CSI feedback message. In various embodiments, the criteria for channel performance may be similar to the search criteria adopted in block 310. In various embodiments, the UE 110 may interpolate the first precoder with each one of precoders in the entire codebook 230, estimate the channel performances of the given subband based on each of the interpolated precoder, identify an interpolated precoder that results in best channel performance for the given subband, and select the precoder that yields the best performing interpolated precoder as the second precoder to be reported in the CSI feedback message. In various embodiments, the interpolation of any two vectors within the codebook 230 may be carried out before-hand, by the UE 110, the eNB 120, or some other entity. The interpolated vectors may be saved into a larger codebook. The UE 110 may then identify the most suitable subband precoder by performing a brutal search of the larger codebook.

In other embodiments, the UE may search only a portion of the precoders within the codebook 230. For example, the UE 110 may only interpolate the first precoder with the precoders that are within a predefined chordal distance from the first precoder.

In various embodiments, if a subband CQI is to be reported in the CSI feedback, the UE 110 may derive the subband CQI based on the interpolated subband precoder, rather than the second precoder.

In block 330, the UE 110 may transmit, via the transmitter 214, the first PMI (e.g., the wideband PMI), the second PMI (e.g., the subband PMI), and/or the CQI to the eNB 120 in a CSI feedback.

Figure 4:
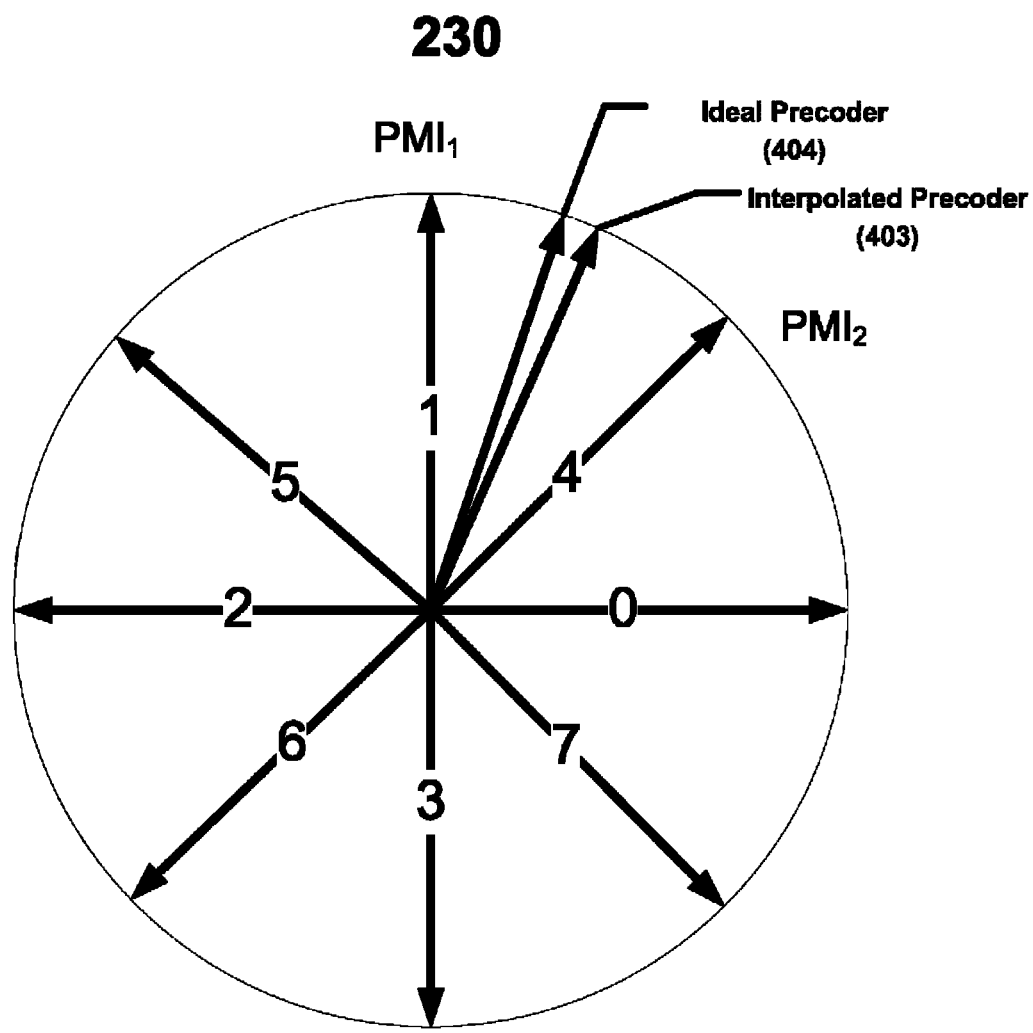
FIG. 4 is a diagram illustrating an example interpolation of a subband precoder based on a wideband PMI and a subband PMI, in accordance with various embodiments of the present disclosure.

FIG. 4 is a diagram illustrating an example interpolation of a subband precoder based on a wideband PMI and a subband PMI, in accordance with various embodiments of the present disclosure. In various embodiments, as illustrated in FIG. 4, a codebook 230 may have 8 DFT rank 1 precoders, labeled 0 through 7, equally splitting the angle of departure into 8 portions, with each DFT vector covering 45 degrees. Even though FIG. 4 depicts 8 DFT precoders, in various embodiments, the codebook 230 may have more or less DFT precoders. In various embodiments, the chordal distance between the precoders may be higher or lower than 45 degrees. Furthermore, the codebook 230 may also include one or more non-DFT precoders that are not shown in FIG. 4.

In various embodiments, the UE 110 may search the codebook 230 and identify the precoder 1 as the wideband precoder that is best suited for the entire frequency band (e.g., the wideband PMI). The UE 110 may then interpolate the precoder 1 with each one of the precoders 0 through 7, and try to find a subband precoder that, after the interpolation, may result in a best performing interpolated precoder for the subband.

In various embodiments, the UE 110 may interpolate only a subset of precoders which are within a predefined chordal distance from the wideband precoder. As illustrated, the UE 110 may interpolate precoders that are within 45 degree of chordal distance with precoder 1, which may be precoders 1, 4, and 5. The UE 110 may find that the interpolated precoder 403 based on the wideband precoder 1 and the subband precoder 4 may be closest to the ideal subband precoder 404. Accordingly, the UE 110 may choose precoder 4 to be reported to the eNB 120 in the CSI feedback message. In various embodiments, the UE 110 may also calculate, or otherwise derive, a subband CQI conditioned upon the interpolated precoder 403, rather than the reported subband precoder 4.

In various embodiments, the eNB 120 may receive the CSI feedback indicating the precoder 1 for the wideband and the precoder 4 for the subband. However, rather than applying the precoder 4 as the precoder for the subband, the eNB 120 may interpolate the precoder 1 with the precoder 4 to reproduce the interpolated precoder 403, and apply this interpolated precoder 403 to the transmission on the subband, which may result in better channel performance.

As illustrated in FIG. 4, in various embodiments, the interpolation of the precoders may reduce the PMI quantization error in half. Furthermore, such reduction of quantization error may be realized without the need to increase the size of the codebook 230. The advantage of interpolating the subband precoder may be more significant when the channel is highly correlated with uniform linear array (ULA) antennas and/or when the UE 110 is moving slowly.

In various embodiments, rather than directly reporting the subband PMI in the CSI feedback, the UE 110 may report a subband differential PMI. Reporting the subband differential PMI may reduce the feedback overhead associated with reporting multiple PMIs. This may be important in situations where it is not feasible to directly report the subband PMI in the CSI feedback. For example, in the PUCCH feedback mode 2-1, the payload size of the subband PMI/CQI report may not exceed 11 bits. However, to report the subband PMI and its corresponding CQI, 13 bits of information may be necessary, including, for example, 4 bits for the subband PMI, 4 bits for the CQI of the first codeword, 3 bits for the differential CQI of the second codeword, and 2 bits for subband label at 10 MHz system bandwidth.

In various embodiments, for example, the UE 110 and the eNB 120 may select a subband differential PMI from a list of four candidate precoders. The UE 110 may select the subband differential PMI by interpolating the wideband precoder with each one of the candidate subband precoder in the list, and identify the best subband precoder among the candidate precoder list. By representing the subband differential PMI in only 2-bits, the UE 110 may report additional subband information without exceeding the payload limitation defined in the CSI feedback message. In various embodiments, the candidate precoder list may be part of the codebook 230, or may be stored in some other components of the station 200.

Tables I, II, and III are example tables illustrating the selection of candidate subband precoders with four transmission antennas (4Tx) for rank 1, 2, and 3 transmissions, respectively. It is understood that the candidate subband PMIs shown in these tables are for purpose of illustration. In various embodiments, the candidate precoders for various ranks of transmission may or may not be the same. In various embodiments, the subband differential PMI may be selected from more or less candidates.

TABLE I

4Tx Rank 1

| | | Wideband PMI Index - Rank 1 | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Subband Differential PMI | 0 | 0 | 1 | 2 | 3 | 4 | 5 | 6 | 7 | 8 | 9 | 10 | 11 | 12 | 13 | 14 | 15 |
| | 1 | 7 | 4 | 5 | 6 | 0 | 1 | 2 | 3 | 1 | 0 | 1 | 0 | 4 | 5 | 5 | 4 |
| | 2 | 4 | 5 | 6 | 7 | 1 | 2 | 3 | 0 | 3 | 2 | 3 | 2 | 7 | 6 | 6 | 7 |
| | 3 | 9 | 8 | 11 | 10 | 8 | 9 | 10 | 11 | 7 | 4 | 5 | 6 | 8 | 9 | 10 | 11 |

TABLE II

4Tx Rank 2

| | | Wideband PMI Index - Rank 2 | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Subband Differential PMI | 0 | 0 | 1 | 2 | 3 | 4 | 5 | 6 | 7 | 8 | 9 | 10 | 11 | 12 | 13 | 14 | 15 |
| | 1 | 1 | 0 | 1 | 0 | 5 | 4 | 0 | 0 | 1 | 0 | 4 | 4 | 0 | 0 | 0 | 0 |
| | 2 | 3 | 2 | 3 | 2 | 10 | 10 | 9 | 9 | 3 | 2 | 5 | 5 | 1 | 1 | 1 | 1 |
| | 3 | 6 | 8 | 9 | 8 | 11 | 11 | 10 | 10 | 9 | 6 | 6 | 6 | 3 | 2 | 2 | 3 |

TABLE III

4Tx Rank 3

| | | Wideband PMI Index - Rank 3 | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Subband Differential PMI | 0 | 0 | 1 | 2 | 3 | 4 | 5 | 6 | 7 | 8 | 9 | 10 | 11 | 12 | 13 | 14 | 15 |
| | 1 | 1 | 0 | 9 | 0 | 7 | 6 | 5 | 4 | 9 | 2 | 1 | 2 | 6 | 4 | 7 | 5 |
| | 2 | 3 | 10 | 11 | 10 | 1 | 1 | 0 | 2 | 11 | 8 | 3 | 8 | 5 | 7 | 4 | 6 |
| | 3 | 6 | 6 | 7 | 12 | 8 | 11 | 11 | 11 | 6 | 12 | 7 | 6 | 1 | 1 | 1 | 1 |

Figure 5:
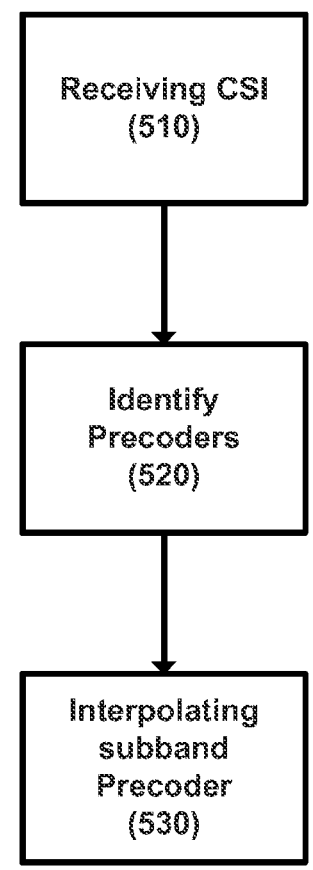
FIG. 5 is a flow diagram illustrating a portion of operations to interpolate a subband PMI, in accordance with various embodiments of the present disclosure.

FIG. 5 is a flow diagram illustrating a portion of the operations to interpolate a subband PMI, in accordance with various embodiments of the present disclosure. In various embodiments, as illustrated, in block 510, the eNB 120 may receive, via the receiver 212, a CSI feedback message indicating the channel state information associated with the downlink channel 140. The CSI feedback message may include a first PMI associated with a first frequency resource, (e.g., a frequency resource for the wideband frequency) and a second PMI associated a second frequency resource (e.g., a frequency resource associated with the subband frequency). In various embodiments, the first PMI may be a wideband PMI, the second PMI may be a subband PMI or a subband differential PMI. In block 520, the eNB 120 may lookup the wideband precoder and the subband precoder from the first and the second PMI based on the codebook 230. If a subband differential PMI is received, the eNB 120 may lookup the subband precoder based on, for example, the look-up tables similar to the Tables I, II, or III illustrated above, which may or may not be integrated into the codebook 230. In block 530, the eNB 120 may, via the interpolator 220, interpolate the wideband precoder and the subband precoder to produce an interpolated subband precoder. The eNB 120 may then adjust the transmission channel based on the interpolated subband precoder.

In various embodiments, the UE 110 may be configured to report multiple wideband PMIs. For example, the UE 110 may be configured to report a first wideband PMI and a second wideband PMI on the PUSCH under reporting mode 3-1, as proposed in the draft 3GPP TS 36.213, Release 10. In various embodiments, the UE 110 may select the first wideband PMI and the second wideband PMI so that the interpolated wideband precoder based on the first and the second wideband PMI may result in better channel performance. Upon receiving the CSI feedback containing the first and the second wideband PMIs, the eNB 120 may interpolate the first and the second wideband PMIs to reproduce the interpolated wideband precoder. One example method of interpolating the first and the second wideband precoders may be the linear average interpolation method discussed above. However, it is understood that other publically known or proprietary interpolation methods may be used.

In various embodiments, the eNB 120 may receive the CSI feedback message including the first wideband PMI and the second wideband PMI. The eNB 120 may, via the interpolator 220, reproduce the interpolated wideband precoder.

In various embodiments, the UE 110 may also report, in addition to the first and the second wideband PMI, a wideband CQI that is based on the interpolated wideband precoder.

In various embodiments, the UE 110 may be configured to report multiple subband PMIs. For example, the UE 110 may be configured to report multiple subband PMIs on the PUSCH under reporting mode 3-2, as proposed in the draft 3GPP TS 36.213, Release 10. However, for certain ranks of communication, reporting a subband PMI on each subband may result in significant feedback overhead. To keep the overhead low while still improving the channel performance, in various embodiments, the UE 110 may selectively report PMI for only a subset of the subbands.

Figure 6:
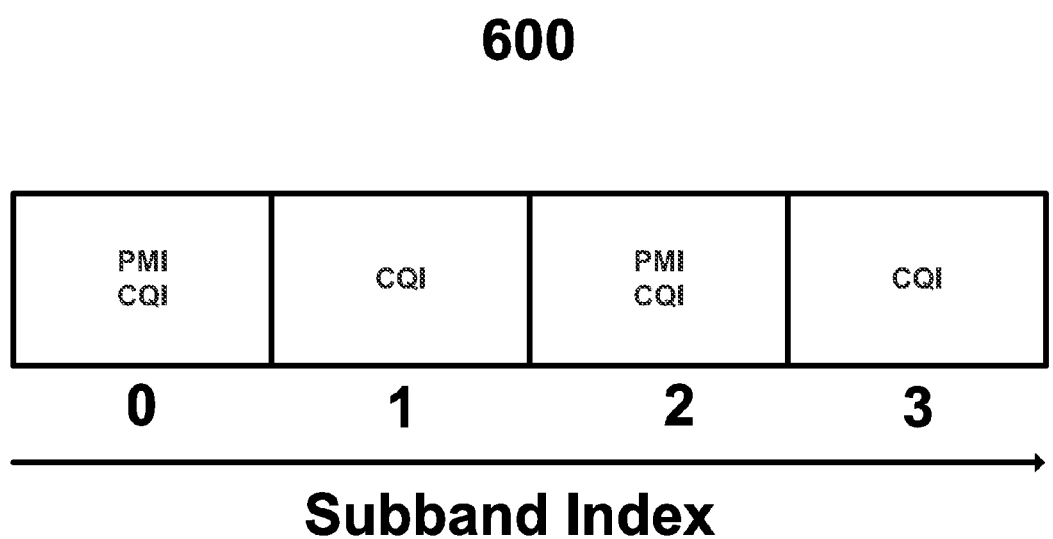
FIG. 6 is a block diagram illustrating an example of reporting PMI for part of the subbands of the frequency channel, in accordance with various embodiments of the present disclosure.

FIG. 6 is a block diagram illustrating an example of reporting PMI for part of the subbands of the frequency channel, in accordance with various embodiments of the present disclosure. FIG. 6 illustrates four subbands, labeled from 0 to 3, respectively. Even though FIG. 6 depicts 4 subbands in the frequency channel, in various embodiments, the channel may have more or less subbands.

In various embodiments, the UE 110 may report both PMI and CQI for the subbands 0 and 2, and may report CQI for the subbands 1 and 3. The UE 110 may interpolate the precoders for the subbands 1 and 3 based on the precoders as indicated in the PMIs for the subbands 0 and 2. One example method of interpolating the subband precoders may be the linear average interpolation method discussed above. For example, the precoder for subband 1 may be a linear average of the precoders of subbands 0 and 2. However, it is understood that other publically known or proprietary interpolation methods may be used. Furthermore, the UE 110 may calculate the CQIs for the subbands 1 and 3 based on the interpolated precoders of these subbands.

In various embodiments, the eNB 120 may receive the CSI feedback message including a first subband PMI (e.g., for the subband 0) and a second subband PMI (e.g., for the subband 2). The eNB 120 may, via the interpolator 220, interpolate the subband precoder for a third subband (e.g., the subband 1). In various embodiments, the third subband may be interleaved between the first and the second subbands. The eNB 120 may then apply the interpolated third subband precoder to the third subband.

In various embodiments, the eNB 120, or the UE 110, may further control how often the subband PMI may be reported and the frequency offset of each reported subband PMI. For example, the eNB 120 may sync with the UE 110, via radio resource control (RRC) signaling, a parameter PMIPeriod that may define the periodicity of subband PMI report, and a parameter PMIOffset that may define the frequency offset in each reported subband PMI. As illustrated in FIG. 6, the PMIPeriod may be 2, indicating that a subband PMI is reported for every two subbands (e.g., the band gap between each reported subband PMI), and the PMIOffset may be 0, indicating no frequency offset in the reported PMI. In various embodiments, the parameter PMIOffset may also be inferred. For example, the PMIOffset may be a function of cell radio network temporary identifier (C-RNTI) and the PMIPeriod, e.g., (e.g. PMIOffset=mod(C-RNTI, PMIPeriod)). The PMIOffset may further be randomly changed or changed in a predefined pattern overtime (e.g., PMIOffset=mod(C-RNTI+ReportIdx, PMIPeriod)) to introduce time domain randomness in order to further improve the feedback accuracy for the whole system band. Such a configuration may also bring sufficient randomness among allowed offsets.

Figure 7:
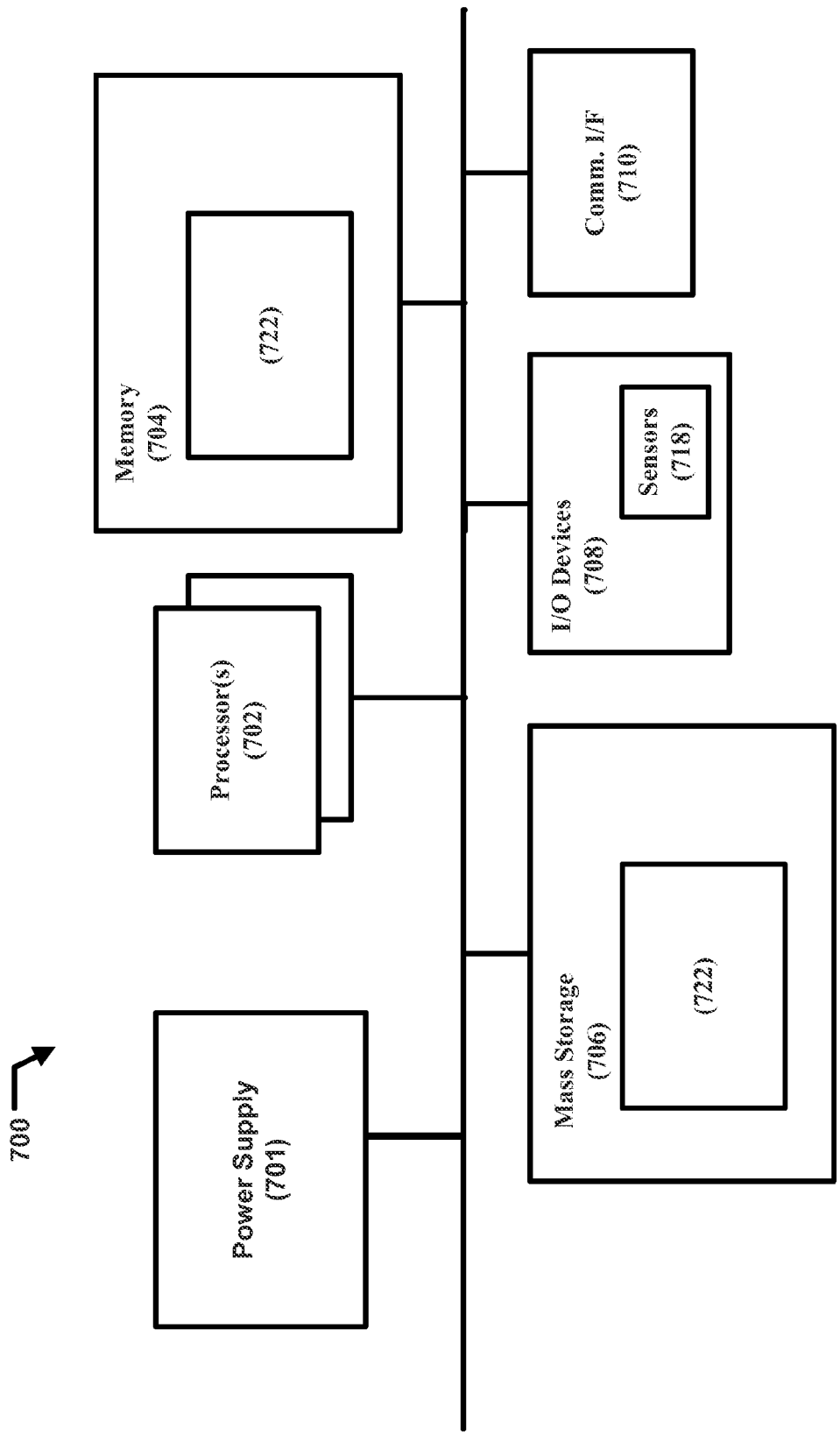
FIG. 7 illustrates an example computer system suitable for use to practice various aspects of the earlier described methods and apparatuses, in accordance with embodiments of the present disclosure.

FIG. 7 illustrates an example computer system suitable for use to practice various aspects of the earlier described methods and apparatuses, in accordance with embodiments of the present disclosure. As shown, a computer system 700 may include a power supply unit 701, a number of processors or processor cores 702, a system memory 704, a mass storage 706, and a communication interface 710. For the purpose of this application, including the claims, the terms "processor" and "processor cores" may be considered synonymous, unless the context clearly requires otherwise.

In various embodiments of the present disclosure, the communication interface 710 may include various components, such as the receiver 212, the transmitter 214, the antenna 216, the interpolator 220, and the codebook 230 as illustrated in FIG. 2.

Additionally, the computing system 700 may include one or more tangible, non-transitory computer-readable mass storage devices 706 (such as diskette, hard drive, compact disc read only memory (CDROM) and so forth), input/output devices 708 (such as keyboard, cursor control and so forth). In various embodiments, the I/O devices 708 may include one or more sensors 718. The sensors 718 may include one or more proximate sensors, ambient light sensors, gyroscopes, magnetic compasses, pressure sensors, temperature sensors, etc. The elements may be coupled to each other and to the earlier enumerated elements via system bus 712, which represents one or more buses. In the case of multiple buses, they may be bridged by one or more bus bridges (not shown).

The system memory 704 and the mass storage 706 may be employed to store a working copy and a permanent copy of the programming instructions implementing one or more operating systems, firmware modules or drivers, applications, and so forth, herein collectively denoted as 722. The permanent copy of the programming instructions may be placed into the permanent storage 706 in the factory, or in the field, through, for example, a distribution medium (not shown), such as a compact disc (CD), or through the communication interface 710 (from a distribution server (not shown)). That is, one or more distribution media having an implementation of the agent program may be employed to distribute the agent and program various computing devices.

The remaining constitution of these elements 701-722 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

What is claimed is:

1. A method comprising:
    receiving, by a fixed station from a user equipment via a wireless communication, channel state information associated with a wireless communication channel, the channel state information including a first precoding matrix indicator (PMI) related to a first precoding matrix associated with one or more frequency resources of the wireless communication channel, and a second PMI related to a second precoding matrix associated with the one or more frequency resources of the wireless communication channel;
    producing, by the fixed node, an interpolated precoding matrix based on an average of the first precoding matrix and the second precoding matrix; and
    transmitting, by the fixed node, a signal via the wireless communication channel based on the interpolated precoding matrix;
    wherein the first PMI includes a wideband PMI associated with the wireless communication channel.

2. The method of claim 1, wherein the second PMI includes a subband differential PMI associated with a subband of the wireless communication channel; and
    wherein said transmitting a signal based on the interpolated precoding matrix comprises:
        applying the interpolated precoding matrix to the subband of the wireless communication channel.

3. The method of claim 2, further comprises:
identifying the second precoding matrix based on the subband differential PMI from a table preconfigured at the fixed node.

4. The method of claim 1, wherein the wideband PMI is a first wideband PMI, and wherein the second PMI includes a second wideband PMI associated with the wireless communication channel, and the receiving the channel state information includes receiving the channel state information on the physical uplink shared channel (PUSCH) under reporting mode 3-1.

5. A method, comprising: identifying, by a user equipment, from a codebook preconfigured at the user equipment, a first precoding matrix associated with a wireless communication channel; interpolating, by the user equipment, the first precoding matrix with one or more second precoding matrices from the codebook to produce one or more interpolated precoding matrices, wherein an interpolated precoding matrix in the one or more interpolated precoding matrices is a linear average of the first precoding matrix and one of the one or more second precoding matrices; transmitting, by the user equipment, via a channel state information feedback message, a first precoding matrix indicator (PMI) related to the first precoding matrix and a second PMI related to a second precoding matrix, selected from the one or more second precoding matrices, to the fixed node, wherein the first precoding matrix is a first wideband precoding matrix associated with the wireless communication channel, the second precoding matrix is a subband precoding matrix associated with a subband of the wireless communication channel, and the or more interpolated precoding matrix is associated with the subband.

6. The method of claim 5, further comprises:
selecting an interpolated precoding matrix from the one or more interpolated precoding matrices based on estimated channel performance of the one or more interpolated precoding matrices, and
selecting the second precoding matrix based on said selecting of the interpolated precoding matrix.

7. The method of claim 6, further comprising:
generating a first channel quality index (CQI) based on the first precoding matrix; and
generating a second CQI based on the interpolated precoding matrix;
wherein the channel state information feedback message includes the first CQI and the second CQI.

8. The method of claim 5, wherein the one or more second precoding matrices include one or more precoding matrices that are within a pre-defined chordal distance from the first precoding matrix.

9. The method of claim 5, wherein the one or more second precoding matrices include a list of candidate precoding matrices from a table preconfigured at the user equipment.

10. The method of claim 5, wherein the first precoding matrix is associated with a first subband of the wireless communication channel, the one or more second precoding matrices include a precoding matrix associated with a second subband of the wireless communication channel, and the one or more interpolated precoding matrices include a precoding matrix associated with a third subband of the wireless communication channel, wherein the third subband interleaves the first and the second subbands.

11. The method of claim 5, wherein the first PMI is a wideband PMI, and wherein the second PMI is a subband differential PMI.

12. An apparatus, comprising:
a receiver configured to receive channel state information associated with a wireless communication channel between a user equipment and the apparatus, the channel state information including information related to a first precoding matrix and information related to a second precoding matrix associated with one or more frequency resources of the wireless communication channel;
an interpolator operatively coupled to the receiver and configured to produce an interpolated precoding matrix based on an average of the first precoding matrix and the second precoding matrix; and
a transmitter operatively coupled to the interpolator to transmit a signal via the wireless communication channel based on the interpolated precoding matrix;
wherein the information related to the first precoding matrix includes a wideband PMI associated with the wireless communication channel.

13. The apparatus of claim 12, wherein the information related to the second precoding matrix includes a subband differential PMI associated with a subband of the wireless communication channel; and
wherein the interpolated precoding matrix is associated with the subband of the frequency resource.

14. The system of claim 12, wherein the wideband PMI is a first wideband PMI, and the information related to the second precoding matrix includes a second wideband PMI associated with the wireless communication channel.

15. A system, comprising: one or more multiple-input-multiple-output (MIMO) antennas; a codebook including a plurality of precoding matrices; a interpolator coupled to the codebook configured to interpolate a first precoding matrix associated with a wireless communication channel between the system and a fixed node with one or more second precoding matrices to produce one or more interpolated precoding matrices, wherein the first precoding matrix and the one or more second precoding matrices are from the codebook, and wherein an interpolated precoding matrix in the interpolated precoding matrices is based at least in part on an average of the first precoding matrix and one of the one or more second precoding matrices; and a transmitter operatively coupled to the interpolator to transmit, via the one or more MIMO antennas, in a channel state information (CSI) feedback message, a first precoding matrix indicator (PMI) related to the first precoding matrix and a second PMI related to at least one of the one or more interpolated precoding matrices to the fixed node, wherein the first PMI includes a first wideband PMI associated with the wireless communication channel, and the second PMI includes a second wideband PMI associated with the wireless communication channel, wherein the at least one of the one or more interpolated precoding matrices is interpolated based on the first precoding matrix and a second precoding matrix indicated by the second wideband PMI.

16. The system of claim 15, wherein the first PMI includes a first subband PMI associated with a first subband of the wireless communication channel, the second PMI includes a second subband PMI associated with a second subband of the wireless communication channel, wherein the at least one of the one or more interpolated precoding matrices is associated with a third subband of the wireless communication channel, and wherein third subband interleaves the first and the second subbands.

17. The system of claim 16, further comprising:
a receiver coupled to the one or more MIMO antennas and configured to receive, from the fixed node, signals indicating frequency offset associated with at least the first precoding matrix, or signals indicating a band gap between the first and the second subbands.

18. The system of claim 15, wherein the interpolator is further configured to select the at least one of the one or more interpolated precoding matrices based on estimated channel performance of the interpolated precoding matrices.

* * * * *

UNITED STATES PATENT AND TRADEMARK OFFICE
CERTIFICATE OF CORRECTION

PATENT NO. : 8,711,907 B2
APPLICATION NO. : 13/077905
DATED : April 29, 2014
INVENTOR(S) : Yuan Zhu et al.

It is certified that error appears in the above-identified patent and that said Letters Patent is hereby corrected as shown below:

In the Claims

Column 13

Line 29, "...and the or more..." should read --...and the one or more...--.

Column 14

Line 54, "...wherein third subband..." should read --...wherein the third subband...--.

Signed and Sealed this
Twelfth Day of May, 2015

Michelle K. Lee
*Director of the United States Patent and Trademark Office*